United States Patent
Lee et al.

(10) Patent No.: US 9,467,924 B2
(45) Date of Patent: Oct. 11, 2016

(54) METHOD FOR PERFORMING SEAMLESS GROUP HANDOVER FOR SUPPORTING PORTABLE TV BAND DEVICE BASED ON TV WHITE SPACE

(71) Applicant: Electronics and Telecommunications Research Institute, Daejeon (KR)

(72) Inventors: Dong Hun Lee, Daejeon (KR); Byung Jang Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 58 days.

(21) Appl. No.: 14/175,362

(22) Filed: Feb. 7, 2014

(65) Prior Publication Data

US 2014/0357279 A1 Dec. 4, 2014

(30) Foreign Application Priority Data

May 29, 2013 (KR) ........................ 10-2013-0061162

(51) Int. Cl.
*H04W 36/00* (2009.01)
*H04W 36/32* (2009.01)

(52) U.S. Cl.
CPC .................................. *H04W 36/32* (2013.01)

(58) Field of Classification Search
CPC ... H04W 36/32; H04W 64/00; H04W 36/08; H04W 36/30; H04W 16/00; H04W 72/00; H04W 36/00; H04W 16/14; H04W 4/026; H04W 4/028; H04W 72/048; H04W 16/16; H04W 36/0011; H04W 48/16; H04W 72/04; H04W 72/08; H04W 12/06; H04W 24/00; H04W 24/02; H04W 28/08; H04W 28/26; H04W 36/0016; H04W 36/005; H04M 11/04; H04N 21/00; G01C 21/26

USPC ...... 455/440, 509, 436, 12.1, 41.2, 427, 433
See application file for complete search history.

(56) References Cited

U.S. PATENT DOCUMENTS

| 8,566,022 | B1 * | 10/2013 | Starenky et al. ............. 701/410 |
| 2006/0140150 | A1 * | 6/2006 | Olvera-Hernandez .......... H04W 36/005 370/331 |
| 2011/0019104 | A1 | 1/2011 | Kwak et al. |
| 2011/0158147 | A1 * | 6/2011 | Li et al. ........................ 370/312 |
| 2011/0164580 | A1 * | 7/2011 | Keon ............................ 370/329 |
| 2011/0194542 | A1 | 8/2011 | Kim et al. |

(Continued)

FOREIGN PATENT DOCUMENTS

| KR | 10-2012-0005494 | 1/2012 |
| KR | 10-1207396 | 12/2012 |
| KR | 10-1341192 | 12/2013 |

*Primary Examiner* — Patrick Edouard
*Assistant Examiner* — B.M. M Hannan
(74) *Attorney, Agent, or Firm* — Nelson Mullins Riley & Scarborough LLP

(57) ABSTRACT

An method for performing a TVBD (TV Band Device) group handover based on TV white space by an AP (Access Point), the method comprising: transmitting multiple location information corresponding to a path along which a mobile vehicle travels to an available channel information providing server; receiving multiple geo-location information from the available channel information providing server as a reply to the transmitted multiple location information; extracting operating channel set information so as to minimize a channel switching caused by the travel of the mobile vehicle, based on the multiple geo-location information; and transmitting the extracted operating channel set information to a TVBD group.

6 Claims, 9 Drawing Sheets

(56) References Cited

U.S. PATENT DOCUMENTS

| | | | |
|---|---|---|---|
| 2011/0310865 A1* | 12/2011 | Kennedy et al. | 370/338 |
| 2012/0101942 A1* | 4/2012 | Park | G06Q 20/0457 705/40 |
| 2012/0170560 A1* | 7/2012 | Han | G01S 5/0252 370/338 |
| 2012/0302240 A1* | 11/2012 | Tamaki et al. | 455/436 |
| 2014/0128073 A1* | 5/2014 | Farhadi | 455/436 |
| 2014/0334422 A1* | 11/2014 | Kim | H04W 72/048 370/329 |
| 2015/0304954 A1* | 10/2015 | Korenaga | B60L 1/00 370/311 |

* cited by examiner

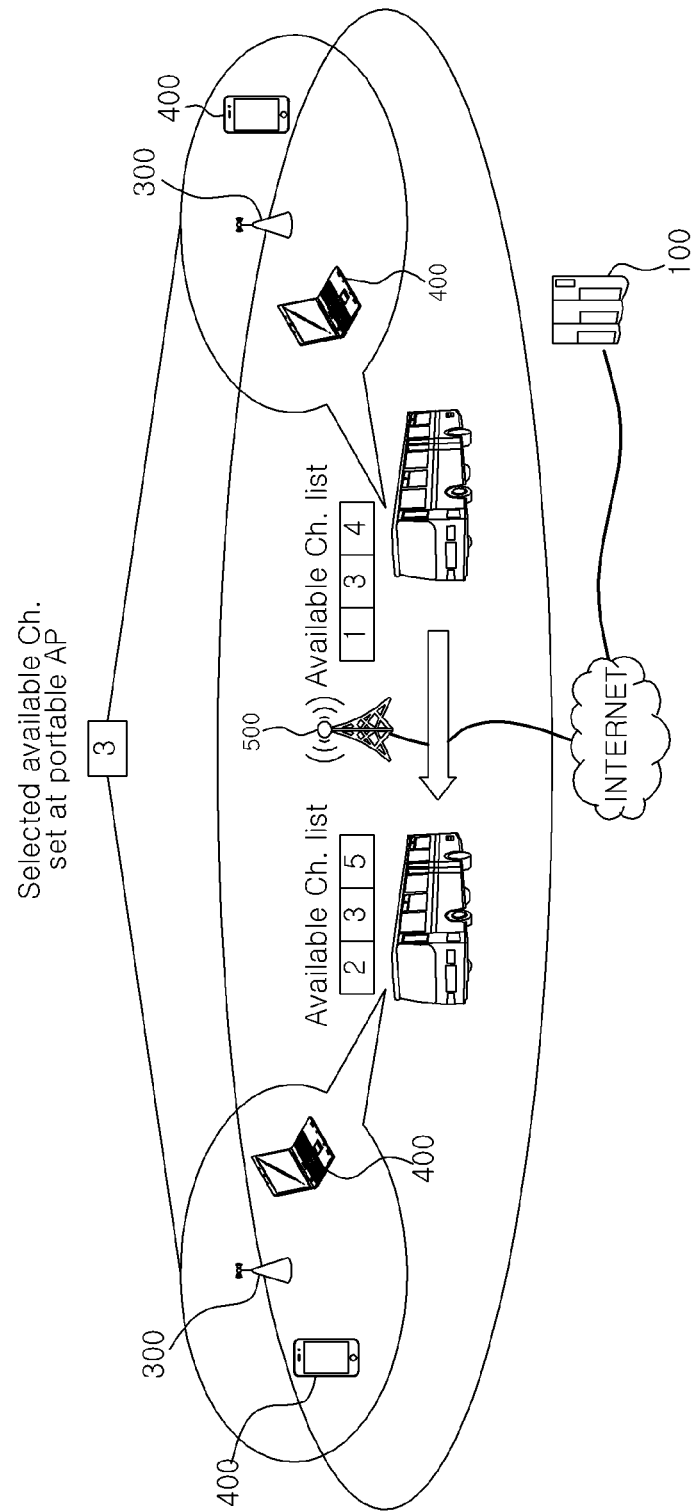

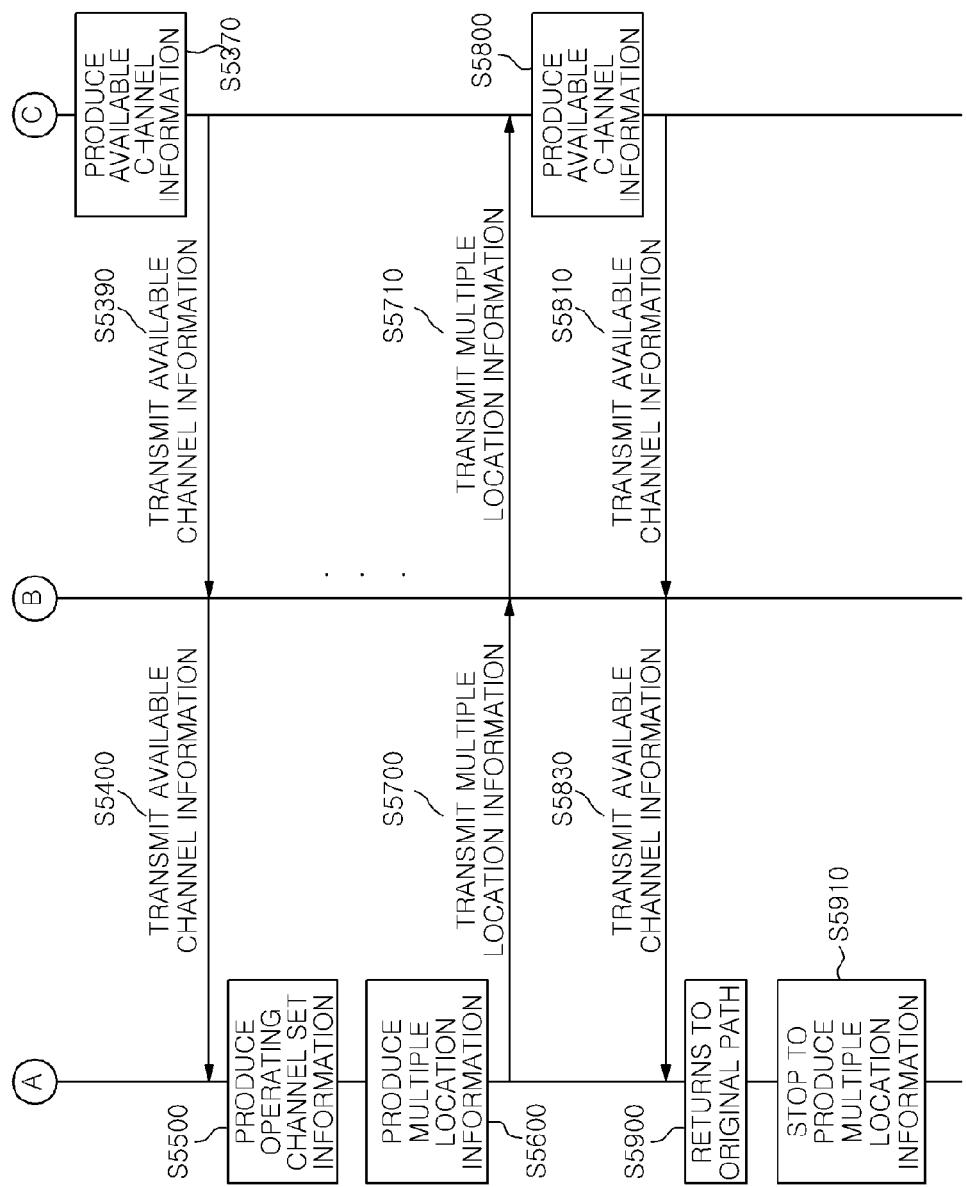

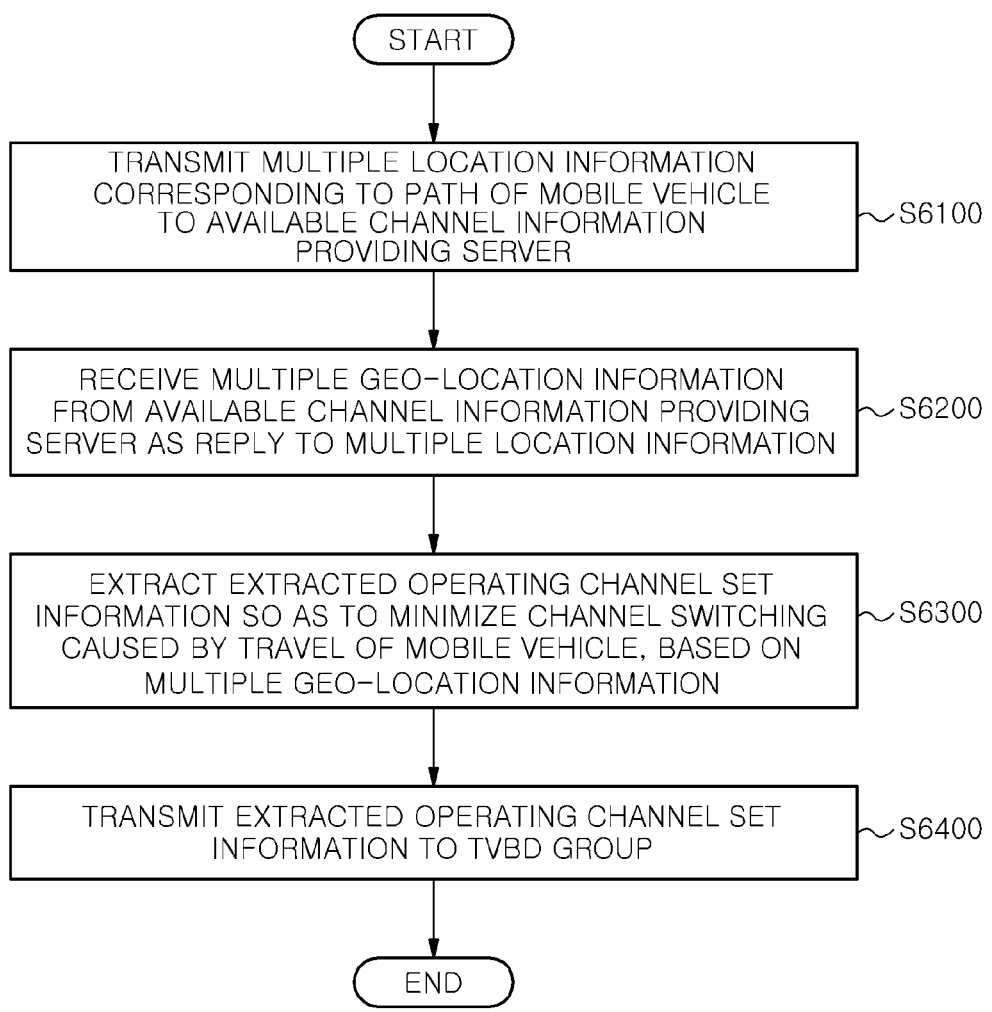

METHOD FOR PERFORMING SEAMLESS GROUP HANDOVER FOR SUPPORTING PORTABLE TV BAND DEVICE BASED ON TV WHITE SPACE

CROSS-REFERENCE TO RELATED APPLICATION(S)

This application is based on and claims priority from and the benefit of Korean Patent Application No. 10-2013-0061162, filed on May 29, 2013, the disclosure of which is incorporated herein in its entirety by reference.

FIELD OF THE INVENTION

The present invention relates to a method for performing a portable TVBD (TV Band Device) group handover based on TV white space, and more particularly, to a method for providing a seamless data service by minimizing channel switching.

BACKGROUND OF THE INVENTION

In recent years, researches trying to use a TV white space frequency band have been progressed due to the transition from terrestrial analog broadcasting to digital broadcasting. Moreover, techniques that allocate the white space frequency band to a smart terminal and a smart pad and perform a handover to the white space frequency band have been developed.

A method how to allocate and perform a handover to the white space frequency band is done by requesting a usable bandwidth at a fixed location. In relation to use the white space, a Korean Laid-Open Patent Publication No. 2010-0084795, which is laid-open published on Aug. 31, 2010, discloses a configuration in which a non-AP station requests a bandwidth of a transmission channel that is usable in a white space frequency band to an AP (Access Point) and the mobile AP, in response thereto, informs the non-AP station of whether the bandwidth of the transmission channel is usable.

However, because the aforementioned method how to use the white space frequency band notifies whether the bandwidth is usable and allocates the bandwidth when a smart terminal requests the bandwidth, the smart terminal may suffer from a situation where a data service is frequently disconnected when using the data service.

SUMMARY OF THE INVENTION

In view of the above, the present invention provides a method for performing a TVBD (TV Band Device) group handover based on TV white space that is capable of providing a seamless group handover to handheld TVBDs that use a white space frequency band. However, the technical subjects of the embodiment of the present invention are not limited to the foregoing technical subject, and there may be other technical subjects.

In accordance with an embodiment of the present invention, there is provided a method for performing a TVBD (TV Band Device) group handover based on TV white space by an AP (Access Point), which includes: transmitting multiple location information corresponding to a path along which a mobile vehicle travels to an available channel information providing server; receiving multiple geo-location information from the available channel information providing server as a reply to the transmitted multiple location information; extracting operating channel set information so as to minimize a channel switching caused by the travel of the mobile vehicle, based on the multiple geo-location information; and transmitting the extracted operating channel set information to a TVBD group.

In the embodiment, the method further comprising: when the travel path of the mobile vehicle is not coincident with the multiple location information, re-transmitting multiple location information corresponding to a travel path that is changed to the available channel information providing server; receiving again multiple geo-location information from the available channel information providing server as a reply to the re-transmitted multiple location information; re-extracting the operating channel set information so as to minimize a channel switching caused by the travel of the mobile vehicle, based on the received again multiple geo-location information; and re-transmitting the re-extracted multiple geo-location information to the TVBD group.

In the embodiment, the method further comprising: when the mobile vehicle enters into an initial point, providing a service using the extracted operating channel set information to the TVBD group.

In the embodiment, the method further comprising: periodically transmitting the multiple location information to the available channel information providing server in order to update available channels depending on the travel of the mobile vehicle.

In the embodiment, the method further comprising: when the mobile vehicle enters into an initial point, stopping the transmission of the multiple location information to the available channel information providing server, wherein the initial point is detected by a location detection device to detect the location of the mobile vehicle.

In accordance with an embodiment of the present invention, there is provided a method for performing a TVBD (TV Band Device) group handover based on TV white space by an AP (Access Point), which includes: transmitting multiple location information corresponding to a path along which a mobile vehicle travels to an available channel information providing server via at least one base station; receiving multiple geo-location information from the available channel information providing server as a reply to the transmitted multiple location information via the at least one base station; extracting operating channel set information so as to minimize a channel switching caused by the travel of the mobile vehicle, based on the multiple geo-location information; and transmitting the extracted operating channel set information to a TVBD group.

In the embodiment, the method further comprising: when the travel path of the mobile vehicle is not coincident with the multiple location information, re-transmitting multiple location information corresponding to a travel path that is changed to the available channel information providing server via the at least one base station; receiving again multiple geo-location information from the available channel information providing server as a reply to the re-transmitted multiple location information via the at least one base station; re-extracting operating channel set information so as to minimize a channel switching caused by the travel of the mobile vehicle, based on the received again multiple geo-location information; and re-transmitting the re-extracted operating channel set information to the TVBD group.

In the embodiment, the method further comprising: when the mobile vehicle enters into an initial point, providing a service using the extracted operating channel set information to the TVBD group.

In the embodiment, the method further comprising: periodically transmitting the multiple location information to the available channel information providing server via at least one base station in order to update available channels depending on the travel of the mobile vehicle.

In the embodiment, the method further comprising: when the mobile vehicle enters into an initial point, stopping the transmission of the multiple location information to the available channel information providing server, wherein the initial point is detected by a location detection device to detect the location of the mobile vehicle.

In accordance with any one of solutions to the aforementioned subject of the present invention, it is possible to provide a seamless wireless Internet service to the users who use public transport.

BRIEF DESCRIPTION OF THE DRAWINGS

The above and other objects and features of the present invention will become apparent from the following description of the embodiments given in conjunction with the accompanying drawings, in which:

FIG. 3 shows an embodiment of performing a handover of a TVBD group by a mobile AP shown in FIG. 1;

FIGS. 5A and 5B are sequence diagrams illustrating a process of transmitting and receiving data between the respective components of a TVBD group handover system based on TV white space in accordance with another embodiment of the present invention;

FIG. 6 is a flow diagram illustrating a method for performing a TVBD group handover based on TV white space in accordance with an embodiment of the present invention.

DETAILED DESCRIPTION OF THE EMBODIMENTS

Figure 1:
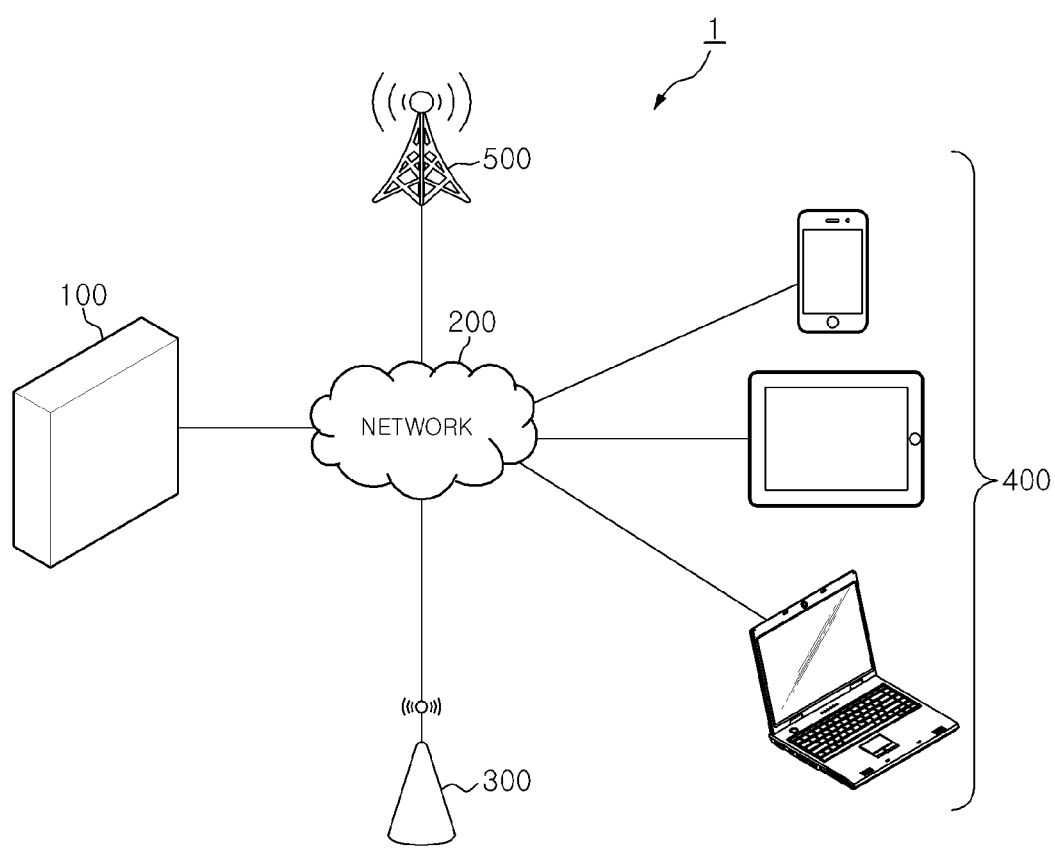
FIG. 1 is a configuration diagram illustrating a system for performing a TVBD group handover based on TV white space in accordance with an embodiment of the present invention.

Hereinafter, embodiments of the present invention will be described in detail with reference to the accompanying drawings so that they can be readily implemented by those skilled in the art. However, the present invention may be embodied in different forms, but it is not limited thereto. In the drawings, further, portions unrelated to the description of the present invention will be omitted for clarity of the description and like reference numerals refer to like components throughout the detailed description.

In the entire specification, when a portion is "connected" to another portion, it means that the portions are not only "connected directly" with each other but they are electrically connected" with each other by way of another device therebetween. Further, when a portion "comprises" a component, it means that the portion does not exclude another component but further comprises other component unless otherwise described. Furthermore, it should be understood that one or more other features or numerals, steps, operations, components, parts or their combinations can be or are not excluded beforehand.

Hereinafter, the embodiments of the present invention will be described in detail with reference to the accompanying drawings.

FIG. 1 is a configuration diagram illustrating a system for performing a TVBD group handover based on TV white space in accordance with an embodiment of the present invention. Referring to FIG. 1, a system 1 for performing a TVBD group handover based on TV white space includes an available channel information providing server 100, a mobile AP 300, a TVBD (TV Band Device) group 400, and at least one base station 500. However, it should be understood that the TVBD group handover system 1 based on TV white space is merely an example of the present invention and the present invention is not construed to be limited to that shown in FIG. 1.

The respective components of FIG. 1 are typically connected through a network 200. For example, as shown in FIG. 1, the available channel information providing server 100 and the mobile AP 300 are connected via the network 200. Also, the mobile AP 300 is connected with the TVBD group 400 via the network 200, and the mobile AP 300 is also connected to the base station 500 via the network 200. In addition, the base station 500 is connected with the available channel information providing server 100 via the network 200, and the mobile AP 300 is connected with the available channel information providing server 100 through the base station 500 via the network 200.

The network used herein refers to a physical connection topology capable of exchanging information between the respective nodes such as terminals and servers, which may include, e.g., a network that utilizes a TV White Space including VHF (Very High Frequency) and UHF (Ultra High Frequency) band, the Internet, LAN (Local Area Network), Wireless LAN (Local Area Network), WAN (Wide Area Network), PAN (Personal Area Network), 3G network, 4G network, LTE network, Wi-Fi network, or the like but is not limited thereto. Further, the available channel information providing server 100, the mobile AP 300, the TVBD group 400, and the base station 500 are also not limited to those illustrated in FIG. 1.

The available channel information providing server 100 may be a server that transmits information about available channels to the mobile AP 300. In the embodiment, the available channels may be channels that may be varied in accordance with a travel path. For example, assuming that available channels at a point A may be channels 1, 3 and 4; and available channels at a point B may be channels 3, 5 and 6. The available channels may be allocated every travel path. Meanwhile, the available channel information may be information that is stored to map it to the locations of the respective points or the travel path. Further, the available channel information is not changed every hour but is stable for some period of time. Such an available channel information providing server 100 may be implemented by a computing device which can be connected with remote servers or terminals through the network 200. Herein, the computing device may include, for example, a notebook computer, desktop computer, laptop computer, or others in which a web browser is installed.

The mobile AP 300 may be a portable unlicensed wireless AP which may be mounted on a mobile vehicle, e.g., public transport vehicle and may provide a network service to the TVBD group 400 that is located in the mobile vehicle. The mobile AP 300 receives the available channel information from the available channel information providing server 100 when it is turned-on or it is located at a particular point in order to provide the seamless network service to the TVBD group 400. Further, the mobile AP 300 provides a set of usable operation channels on the travel path of the mobile vehicle to the TVBD group 400 using the available channel information that is received. In this connection, when the mobile AP 300 receives the available channel information from the available channel information providing server 100, it does not connect to the available channel information providing server 100 every point on the travel paths but receives the available channel information about the entire travel paths of the mobile vehicle. Therefore, the mobile AP 300 may enable to perform the seamless handover of the TVBD group 400 located in the mobile vehicle. In addition, the mobile AP 300 may detect the location of the mobile vehicle on which it is mounted. Thus, the mobile AP 300 may include a location detection device (not shown) or may be connected to a location detection device. In this case, the location detection device may be a GPS (Global Positioning System), at least one base station 500 or a terminal which detects its current location by receiving location information of a fixed AP (not shown).

The TVBD group 400 may be a group of terminals that use the data service through the mobile AP 300. Since the TVBD group 400 placed on the public transport, for example, such as a train or a bus is provided with a seamless handover by virtue of the mobile AP 300, the TVBD group 400 may not experience the disconnection of the data transmission and reception at each point when using the data service. The TVBD group 400 may be implemented in various terminals capable of accessing remote servers or terminals. The TVBD group 400 may be a group of wireless communication devices that ensure portability and mobility, for example, which may include any kind of handheld-based wireless communication devices such as a handset for PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), and Wibro (Wireless Broadband Internet), smartphone, smart pad, Tablet PC, and the like.

When the mobile AP 300 cannot obtain the available channel information directly from the available channel information providing server 100, the base station 500 may be connected with the available channel information providing server 100 to relay data transmitting and receiving to and from the mobile AP 300. The base station 500 may be a base station located on the travel path of the mobile vehicle on which the mobile AP 300 is mounted or a fixed base station. If the mobile vehicle is out of the travel path, the mobile AP 300 may detect its own location using the location of the base station 500. For example, it is assumed that the mobile vehicle travels along a travel path of points A, B and C in order. When the mobile vehicle travels along a path of points A->D->C due to traffic congestion, the mobile AP 300 needs to detect its own location in order to obtain the usable channel information at its current location. To do so, the mobile AP 300 may identify that the mobile vehicle is located at the point D by communicating with the base station 500 located at the point D. Alternatively, the mobile AP 300 may detect its own location using a location detection device such as a GPS.

Figure 2:
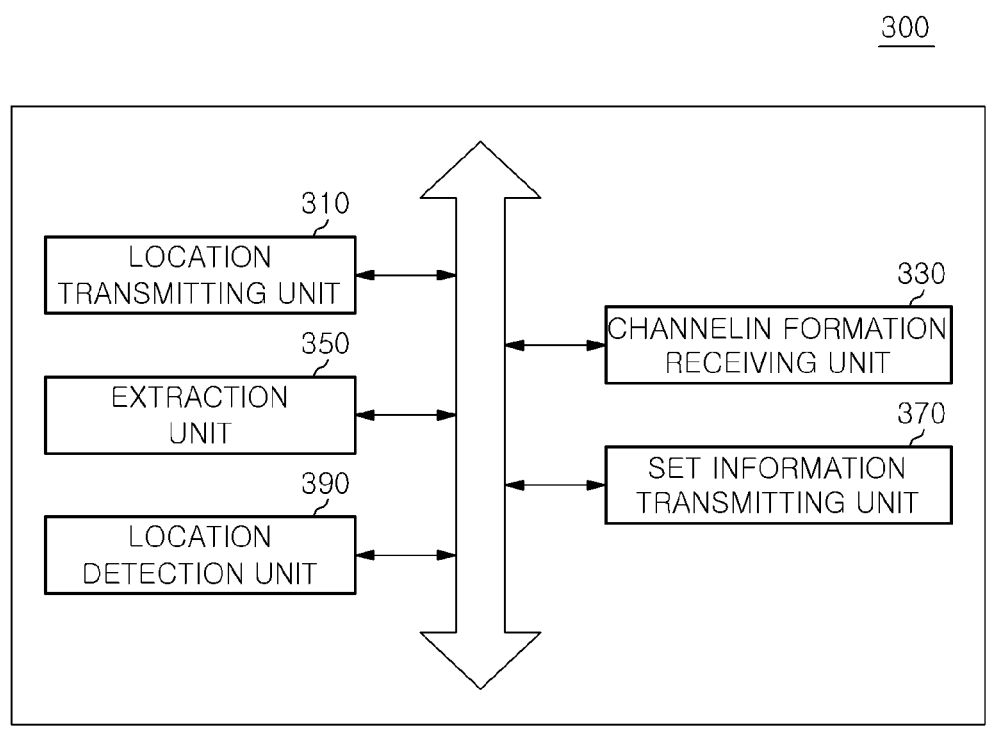
FIG. 2 is a block diagram of a mobile AP shown in FIG. 1.

FIG. 2 is a block diagram of the mobile AP shown in FIG. 1, and FIG. 3 shows an embodiment of performing a handover of a TVBD group by the mobile AP shown in FIG. 1.

Referring to FIG. 2, the mobile AP 300 of the embodiment includes a location transmitting unit 310, a channel information receiving unit 330, an extraction unit 350, a set information transmitting unit 370, and a location detection unit 390.

The location transmitting unit 310 transmits multiple location information corresponding to a path along which the mobile vehicle travels. The multiple location information may be points located at the path along which the mobile vehicle travels. For example, assuming that the mobile vehicle travels from a point A to a point B and points C, D, E are placed between the points A and B, the multiple location information is the points A, C, D, E, and B. The multiple location information may be periodically transmitted to the available channel information providing server 100 in order to update the available channels in accordance with the travel of the mobile vehicle. The multiple location information is acquired by the location detection unit 390.

The channel information receiving unit 330 receives the multiple geo-location information from the available channel information providing server 100 as a reply to the transmitted multiple location information. The multiple geo-location information may be information about the usable channels at the respective points. For example, the usable channel information may be different every a constant range in the TV white space frequency band. As an example, channels 1, 2 and 3 may be usable channels at a point A; and channels 3, 4 and 5 may be usable channels at a point B distanced from the point A. Thus, the multiple geo-location information may be the multiple geo-location information that are usable at multiple locations and may be information to which usable multiple channels are mapped for multiple locations.

The extraction unit 350 extracts information about a set of operating channels so as to minimize channel switching caused by the travel of the mobile vehicle, based on the multiple geo-location information. The description of the extraction unit 350 will be made with reference to FIG. 3. Referring to FIG. 3, channels 1, 3 and 4 are usable channels at a point where a first bus on the right side is located; and channels 2, 3, and 5 are usable channels at a point where a second bus on the left side. If the first bus travels from the right side to the left side, the mobile AP 300 mounted on the first bus can provide the seamless network service to the TVBD group 400 by utilizing the channel 3. As such, the extraction unit 350 extracts the operating channel set so as to minimize the number of switching operations based on the available channel information corresponding to the travel path of the mobile vehicle. In addition, in case where the number of usable channels is multiple in the travel path along which the mobile AP 300 moves, the number of combinations of available channels that can be connected to in each point may be multiple. For example, assuming the available channels 1, 2, 3, 4, and 5 at a point A; available channels 2, 3, 4, 5, and 6 at a point B; available channels 3, 4, 5, 6, and 7 at a point B; and available channels 2, 3, 4, 5, and 8 at point D, the number of cases of selecting available channels may be $_5C_1 *_5C_1 *_5C_1$. The extraction unit 350 extracts the operating channel set information by selecting the combination that allows to minimize the number of switching from among the combinations of available channels $_5C_1 *_5C_1 *_5C_1$. Any method may be employed if minimizing the number of switching.

Referring back to FIG. 2, the set information unit 370 transmits the extracted operating channel set information to the TVBD group 400. In other words, the operating channel set information that minimizes the number of switching operations is provided to the TVBD group 400, which results in providing the seamless network service even when the mobile vehicle travels.

If the travel path of the mobile vehicle is not coincident with the multiple location information, the location transmitting unit 310 re-transmits multiple location information corresponding to the travel path that is changed to the available channel information providing server 100. Herein, the re-transmission may have the same meaning as update or synchronization. A situation where the travel path of the mobile vehicle is not coincident with the multiple location information may be detected by the location detection unit 390 to detect the location of the mobile vehicle. The location detection unit 390 may be a device that directly detects its own location such as GPS, a fixed AP, or a device such as a base station that is located fixedly at a certain spot and is able to acquire its own location indirectly through a medium capable of communicating with a location detection device.

The channel information receiving unit 330 receives again the multiple geo-location information as a reply to the multiple location information transmitted from the available channel information providing server 100. Also, the extraction unit 350 re-extracts the operating channel set information so as to minimize the channel switching caused by the travel of the mobile vehicle, and the set information unit 370 re-transmits the re-extracted operating channel set information to the TVBD group 400.

Finally, the mobile AP 300 provides the network service using the extracted operating channel set information to the TVBD group 400 when the mobile vehicle enters an initial point. For example, it is assumed that the mobile AP 300 came through a path of A-B-C-D. In this case, because the operating channel set information is stable for a certain period of time in the path of A-B-C-D, the mobile AP 300 does not locate the available channels but uses the available channel information that has been previously extracted. Further, when the mobile vehicle returns to the initial point, the mobile AP 300 may stop the transmission of the multiple location information to the available channel information providing server 100. A situation where the mobile vehicle is placed at the initial point can be acquired by the location detection unit 390.

Meanwhile, if the mobile AP 300 is not connected to the available channel information providing server 100, it may be connected to the available channel information providing server 100 via the base station 500, of which embodiment will be described hereinafter. However, the same content as described above will be omitted since it is redundant.

The location transmitting unit 310 transmits the multiple location information corresponding to the path along which the mobile vehicle travels to the available channel information providing server 100 via the base station 500. As a reply to the multiple location information transmitted from the available channel information providing server 100, the channel information receiving unit 330 receives the multiple geo-location information via the base station 500. The extraction unit 350 extracts the operating channel set information so as to minimize the channel switching caused by the travel of the mobile vehicle, based on the multiple geo-location information, and the set information unit 370 transmits the extracted operating channel set information to the TVBD group 400.

In case where the travel path of the mobile vehicle is not coincident with the multiple location information, the location transmitting unit 310 re-transmits the multiple location information corresponding to the travel path that is changed to the available channel information providing server 100 via the base station 500. At this time, the location transmitting unit 310 periodically transmits the multiple location information to the available channel information providing server 100 via the base station 500 in order to update the available channels caused by the travel of the mobile vehicle. In response to the multiple location information re-transmitted from the available channel information providing server 100, the channel information receiving unit 330 receives again the multiple geo-location information via the base station 500. The extraction unit 350 then re-extracts the operating channel set information so as to minimize the channel switching caused by the travel of the mobile vehicle, based on the received again multiple channel information, and the set information unit 370 re-transmits the re-extracted operating channel set information to the TVBD group 400.

Further details of the method of performing a TVBD group handover based on TV white space illustrated in FIGS. 2 and 3 will not be described below since they are similar or identical to the description made through FIG. 1 and can be easily inferred from the description.

Figure 4A:
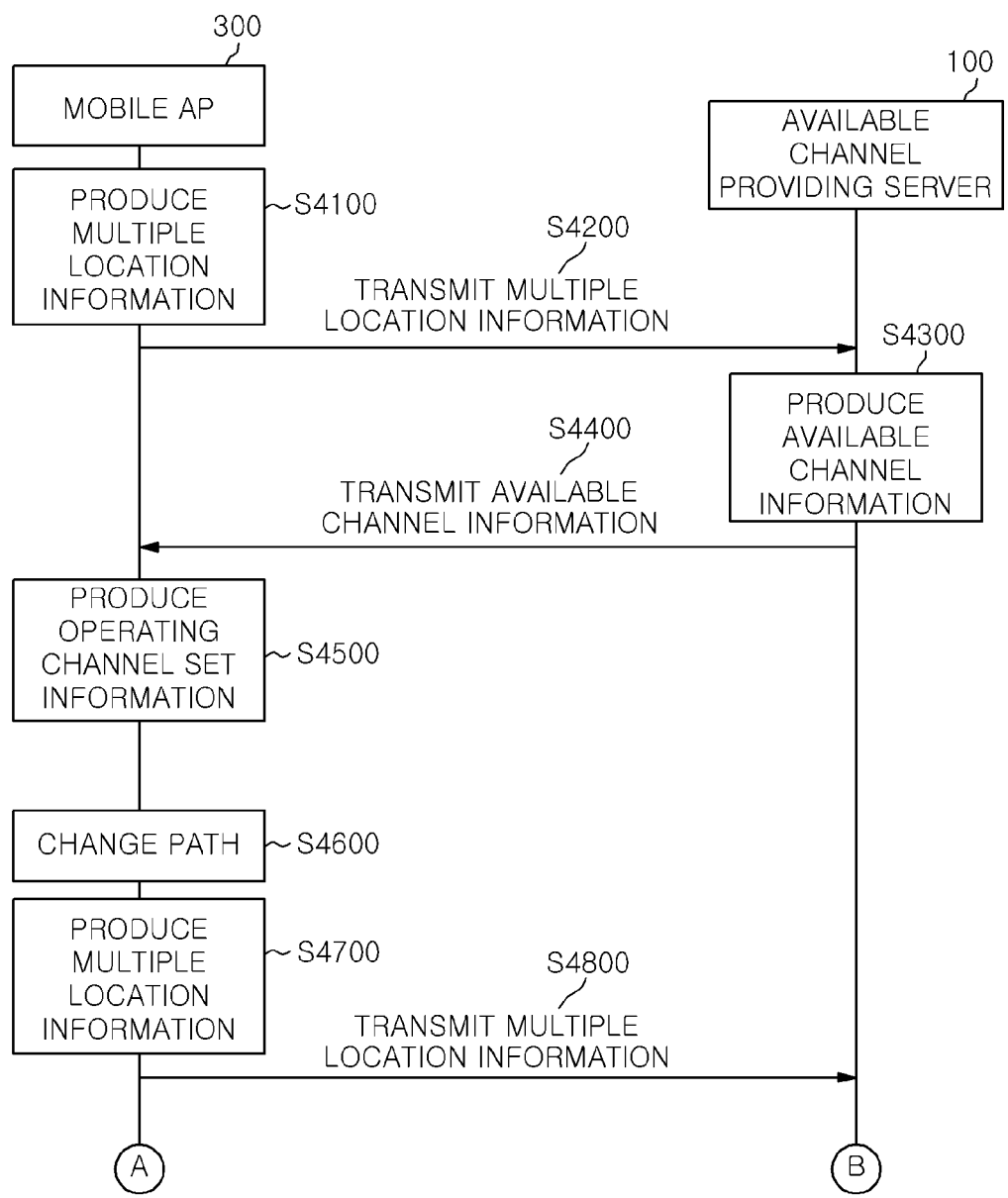
FIGS. 4A and 4B are sequence diagrams illustrating a process of transmitting and receiving data between the respective components of a TVBD group handover system based on TV white space in accordance with an embodiment of the present invention.
Figure 4B:
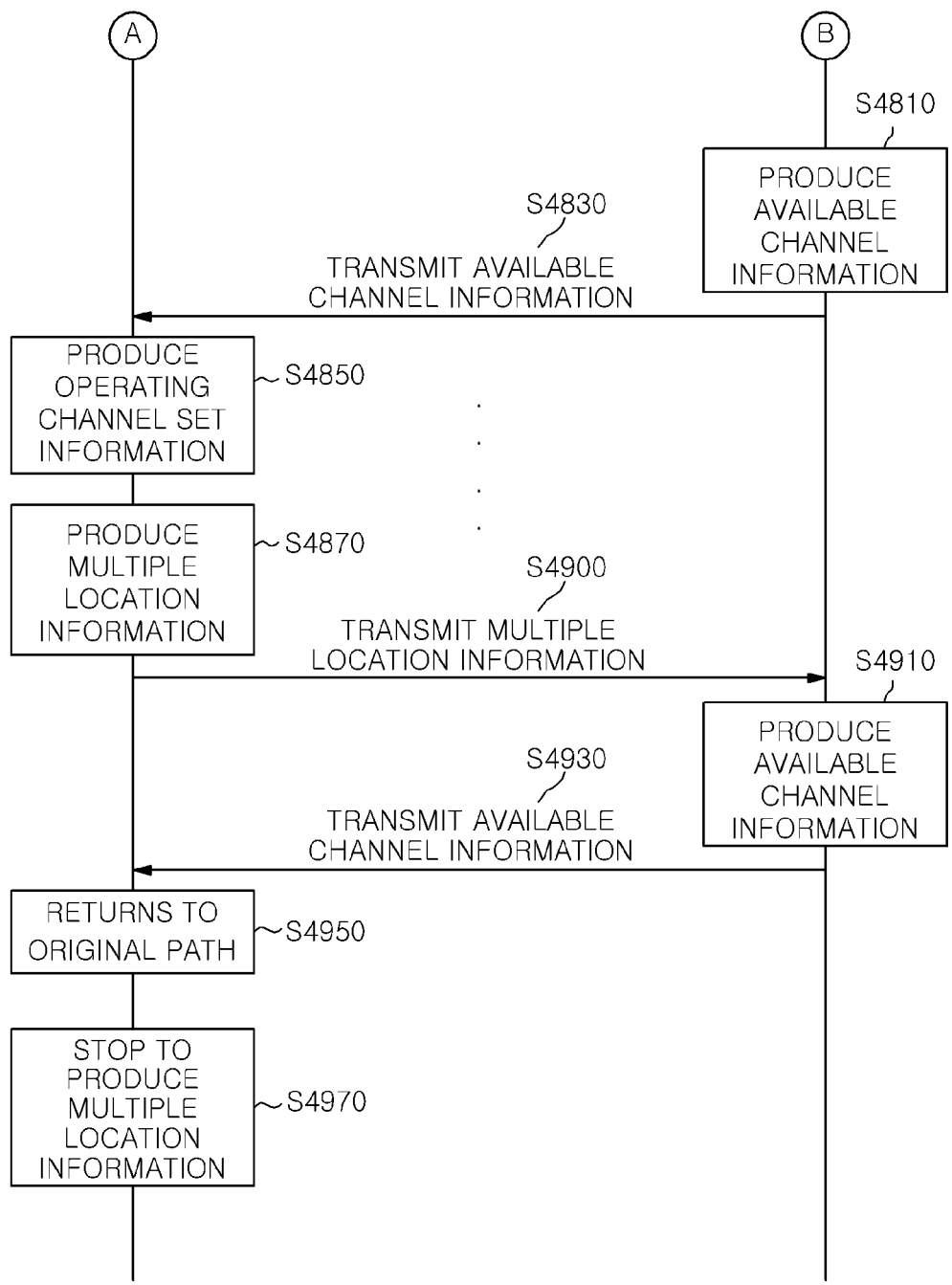
Figure 5A:
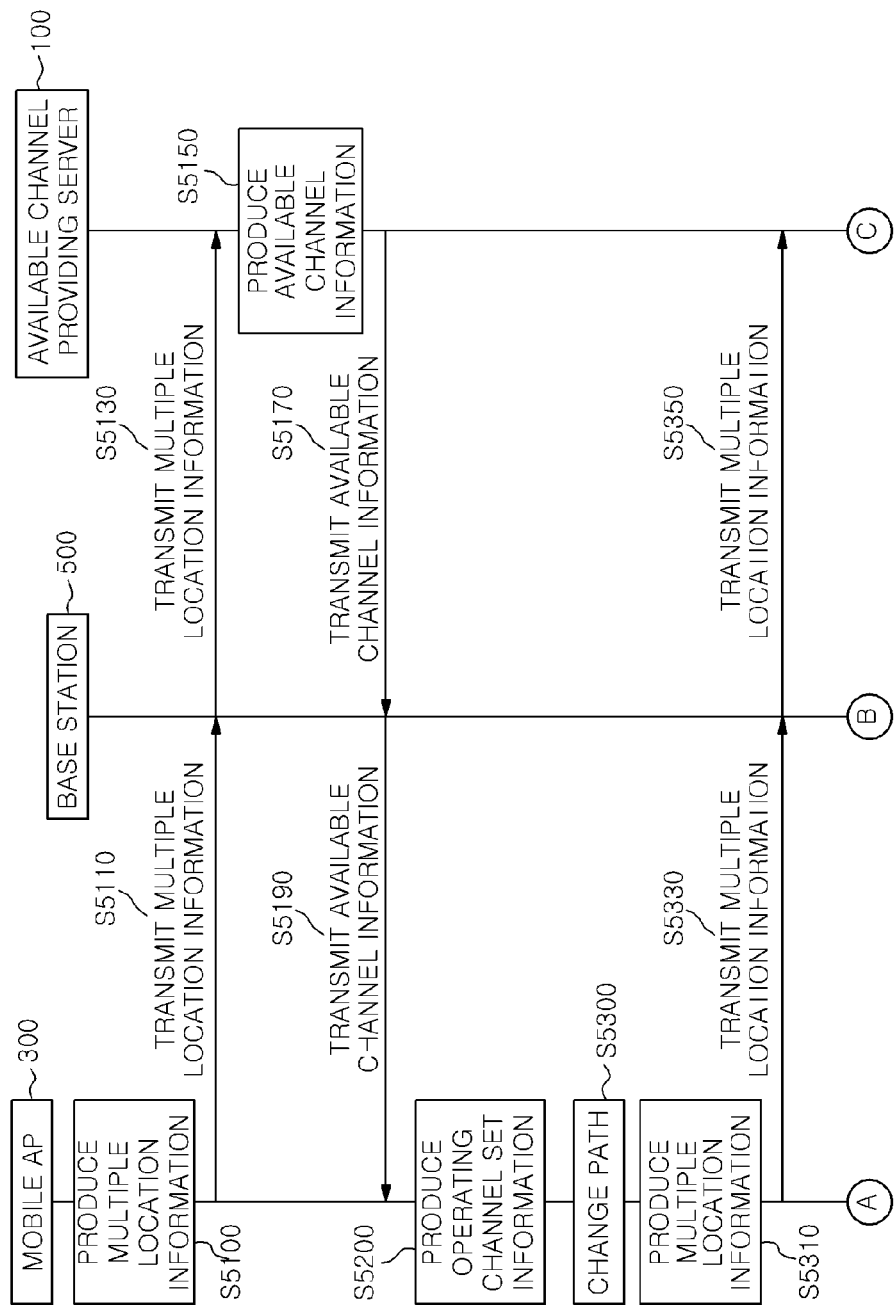

FIG. 4 is a sequence diagram illustrating a process of transmitting and receiving data between the respective components of the TVBD group handover system based on TV white space in accordance with an embodiment of the present invention; and FIG. 5 is a sequence diagram illustrating a process of transmitting and receiving data between the respective components of the TVBD group handover system based on TV white space in accordance with another embodiment of the present invention. Hereinafter, an example of the process that transmits and receives a signal will be described with reference to FIGS. 4 and 5, however, the present invention is not limited to such an embodiment and it will be appreciated by those skilled person in the art that the process to transmit and receive the data as shown in FIGS. 4 and 5 may be changed with various embodiments as set forth above.

Referring to FIG. 4, the mobile AP 300 produces the multiple location information related to the multiple locations of the mobile vehicle (S4100), and accesses the available channel information providing server 100 for the transmission of the multiple location information (S4200). Upon receipt of the multiple location information, the available channel information providing server 100 produces the available channel information relevant to the multiple location information (S4300) and transmits the available channel information to the mobile AP 300 (S4400).

Upon receipt of the available channel information, the mobile AP 300 produces the operating channel set information so as to minimize the channel switching as much as possible based on the available channel information (S4500). If the path of the mobile vehicle is changed (S4600), the mobile AP 300 produces again the multiple location information (S4700) and transmits the produced multiple location information to the available channel information providing server 100 (S4800). Next, after the available channel information providing server 100 produces the available channel information (S4810), the mobile AP 300 receives the available channel information from the available channel information providing server 100 (S4830) and then produces the operating channel set information (S4850). If the travel path is changed, the mobile AP 300 periodically updates the available channel information relevant to the multiple locations by accessing the available channel information providing server 100.

If the mobile vehicle returns to an original path, that is, the initial path (S4950), the mobile AP 300 stops to produce the multiple location information (S4970) so as to continue to use the operating channel set information that has been obtained already.

Referring now to FIG. 5, the mobile AP 300 produces the multiple location information related to the multiple locations of the mobile vehicle (S5100) and accesses the available channel information providing server 100 in order for the transmission of the multiple location information via the base station 500 (S5130). Upon receipt of the multiple location information, the available channel information providing server 100 produces the available channel information relevant to the multiple location information (S5150) and transmits the available channel information to the base station 500 (S5170), which in turn transmits it to the mobile AP 300 (S5190).

Upon receipt of the available channel information, the mobile AP 300 produces the operating channel set information so as to minimize the channel switching as much as possible based on the available channel information (S5200). If the travel path of the mobile vehicle is changed (S5300), the mobile AP 300 produces again the multiple location information (S5310) and transmits the produced multiple location information to the base station 500 (S5330), which in turn transmits it to the available channel information providing server 100 (S5350). Next, after the available channel information providing server 100 produces the available channel information (S5370), the mobile AP 300 receives the available channel information via the base station 500 (S5390) from the available channel information providing server 100 (S5400) and then produces the operating channel set information (S5500). If the travel path is changed, the mobile AP 300 periodically updates the available channel information relevant to the multiple locations by indirectly accessing the available channel information providing server 100 (S5600 to S5830) as similar to S5100 to S5190 as mentioned earlier.

If the mobile vehicle returns to an original path, that is, the initial path (S5900), the mobile AP 300 stops to produce the multiple location information (S5910) so as to continue to use the operating channel set information that has been obtained already.

Further details of the method of performing a TVBD group handover based on TV white space illustrated in FIGS. 4 and 5 will not be described below since they are similar or identical to the description made through FIGS. 1 to 3 and can be easily inferred from the description.

The order of the above operations described in blocks S4100 to S4970 and S5100 to S5910 is merely an example and not limited thereto. In other words, the order of the operations described in blocks S4100 to S4970 and S5100 to S5910 may be mutually exchanged, and some of these operations may be simultaneously executed or removed.

Figure 7:
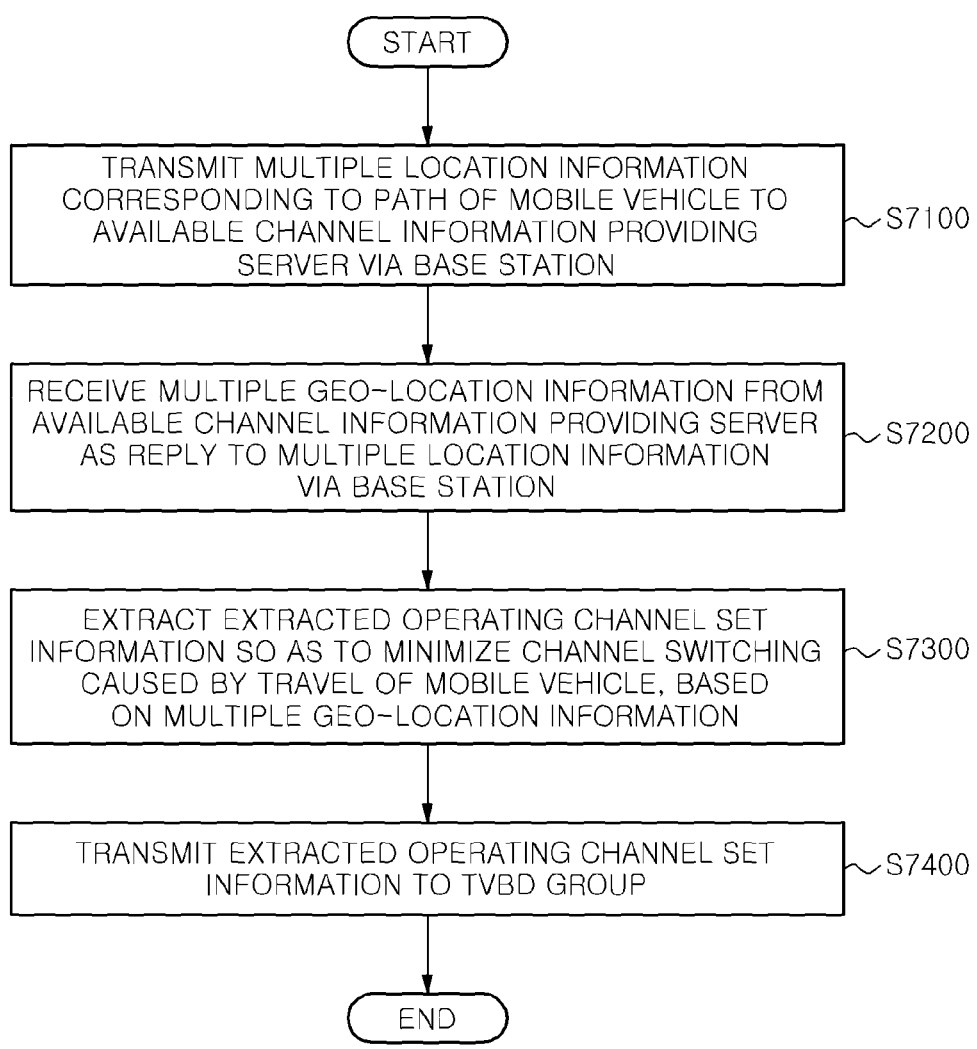
FIG. 7 is a flow diagram illustrating a method for performing a TVBD group handover based on TV white space in accordance with another embodiment of the present invention.

FIG. 6 is a flow diagram illustrating a method for performing a TVBD group handover based on TV white space in accordance with an embodiment of the present invention; and FIG. 7 is a flow diagram illustrating a method for performing a TVBD group handover based on TV white space in accordance with another embodiment of the present invention.

Referring to FIG. 6, the mobile AP 300 transmits the multiple location information corresponding to the travel path along which the mobile vehicle travels to the available channel information providing server 100 (S6100) and receives the multiple geo-location information from the available channel information providing server as a reply to the multiple location information (S6200).

Next, the mobile AP 300 extracts the operating channel set information so as to minimize the channel switching caused by the travel of the mobile vehicle based on the multiple geo-location information (S6300) and transmits the extracted operating channel set information to the TVBD group 400 (S6400).

Referring to FIG. 7, the mobile AP transmits the multiple location information corresponding to the travel path along which the mobile vehicle travels to the available channel information providing server via the base station (S7100). Thereafter, the mobile AP receives the multiple geo-location information via the base station from the available channel information providing server as a reply to the multiple location information (S7200). The mobile AP then extracts the operating channel set information so as to minimize the channel switching caused by the travel of the mobile vehicle based on the multiple geo-location information (S7300) and transmits the extracted operating channel set information to the TVBD group (S7400).

Further details of the method of performing a TVBD group handover based on a TV white space illustrated in FIGS. 6 and 7 will not be described below since they are similar or identical to the description made through FIGS. 1 to 5 and can be easily inferred from the description.

The method of the method for performing a TVBD group handover based on TV white space in accordance with an embodiment of the present invention described in FIGS. 6 and 7 may be implemented in the form of recording media including instructions executable by a computer, such as applications or program modules that are executed by a computer. The computer readable media may be any available media that can be accessed by a computer and may include volatile and nonvolatile media, and removable and non-removable media. Further, the computer readable media may include any computer storage media and communication media. The computer storage media may include any volatile and nonvolatile media and removable and non-removable storage media that are implemented in any methods or technologies for the storage of information such as data and computer-readable instructions, data structures, program modules, or other data. The communication media may include a transport mechanism or any information delivery media for transmitting computer readable instructions, data structures, program modules or other data of modulated data signal such as carrier waves.

Description of the present invention as described above are intended for illustrative purposes, and it will be understood to those having ordinary skill in the art that this invention can be easily modified into other specific forms without changing the technical idea and the essential characteristics of the present invention.

What is claimed is:

1. A method for performing a TVBD (TV Band Device) group handover based on TV white space by an AP (Access Point) mounted on a mobile vehicle, the method comprising:
   transmitting multiple location information corresponding to a path along which the mobile vehicle travels to an available channel information providing server;
   receiving multiple geo-location information from the available channel information providing server as a reply to the transmitted multiple location information, wherein the multiple geo-location information includes available channel information relevant to the multiple location information;

extracting operating channel set information so as to minimize a channel switching caused by a travel of the mobile vehicle, based on the multiple geo-location information;

transmitting the extracted operating channel set information to a TVBD group;

transmitting periodically the multiple location information to the available channel information providing server in order to update available channels depending on the travel of the mobile vehicle; and stopping the transmission of the multiple location information to the available channel information providing server when the mobile vehicle enters into an initial point of the path and the operating channel set information is stable for a predetermined period, wherein the initial point is detected by a location detection device detecting the location of the mobile vehicle.

2. The method of claim 1, further comprising:

when the travel path of the mobile vehicle is not coincident with the multiple location information, re-transmitting multiple location information corresponding to a travel path that is changed to the available channel information providing server;

receiving again multiple geo-location information from the available channel information providing server as a reply to the re-transmitted multiple location information;

re-extracting the operating channel set information so as to minimize a channel switching caused by the travel of the mobile vehicle, based on the received again multiple geo-location information; and re-transmitting the re-extracted multiple geo-location information to the TVBD group.

3. The method of claim 1, further comprising:

when the mobile vehicle enters into an initial point, providing a service using the extracted operating channel set information to the TVBD group.

4. A method for performing a TVBD (TV Band Device) group handover based on TV white space by an AP (Access Point) mounted on a mobile vehicle, the method comprising:

transmitting multiple location information corresponding to a path along which the mobile vehicle travels to an available channel information providing server via at least one base station;

receiving multiple geo-location information from the available channel information providing server as a reply to the transmitted multiple location information via the at least one base station, wherein the multiple geo-location information includes available channel information relevant to the multiple location information;

extracting operating channel set information so as to minimize a channel switching caused by a travel of the mobile vehicle, based on the multiple geo-location information;

transmitting the extracted operating channel set information to a TVBD group;

transmitting periodically the multiple location information to the available channel information providing server via at least one base station in order to update available channels depending on the travel of the mobile vehicle; and stopping the transmission of the multiple location information to the available channel information providing server when the mobile vehicle enters into an initial point of the path and the operating channel set information is stable for a predetermined period, wherein the initial point is detected by a location detection device detecting the location of the mobile vehicle.

5. The method of claim 4, further comprising:

when the travel path of the mobile vehicle is not coincident with the multiple location information, re-transmitting multiple location information corresponding to a travel path that is changed to the available channel information providing server via the at least one base station;

receiving again multiple geo-location information from the available channel information providing server as a reply to the re-transmitted multiple location information via the at least one base station;

re-extracting operating channel set information so as to minimize a channel switching caused by the travel of the mobile vehicle, based on the received again multiple geo-location information; and re-transmitting the re-extracted operating channel set information to the TVBD group.

6. The method of claim 4, further comprising:

when the mobile vehicle enters into an initial point, providing a service using the extracted operating channel set information to the TVBD group.

* * * * *